United States Patent
Knox, Jr.

[19]

[11] Patent Number: 5,970,694
[45] Date of Patent: Oct. 26, 1999

[54] QUICK MOUNT LEVELING, ADJUSTABLE AND RETRACTABLE ROLLER STABILIZER FOR STRING TRIMMERS

[76] Inventor: Robert J. Knox, Jr., 84 Knox Rd., Litchfield, Conn. 06759

[21] Appl. No.: 09/165,216

[22] Filed: Oct. 1, 1998

Related U.S. Application Data

[60] Provisional application No. 60/060,988, Oct. 3, 1997.

[51] Int. Cl.⁶ ..................................... A01D 53/14
[52] U.S. Cl. .............................. 56/16.7; 30/276; 56/17.2; 56/17.5; 172/17
[58] Field of Search ..................................... 56/12.1, 12.5, 56/12.7, 16.7, 17.5, 17.2; 172/17, 13, 14, 15, 16; 280/47.17, 47.2, 47.24; 30/276

[56] References Cited

U.S. PATENT DOCUMENTS

| | | | |
|---|---|---|---|
| 4,182,100 | 1/1980 | Letter | 56/16.7 |
| 4,442,659 | 4/1984 | Enbusk . | |
| 4,531,350 | 7/1985 | Huthmacher | 56/17.5 |
| 4,688,376 | 8/1987 | Wolfe . | |
| 4,704,849 | 11/1987 | Gilbert et al. . | |
| 4,879,869 | 11/1989 | Buckendorf . | |
| 5,092,112 | 3/1992 | Buckendorf . | |
| 5,222,750 | 6/1993 | Ellis . | |
| 5,408,816 | 4/1995 | Cartier | 56/17.5 |
| 5,450,715 | 9/1995 | Murray . | |
| 5,836,142 | 11/1998 | Maxwell | 56/16.7 X |

*Primary Examiner*—Robert E. Pezzuto
*Attorney, Agent, or Firm*—Ware Fressola; Van Der Sluys & Adolphson

[57] ABSTRACT

A lightweight, retractable tripod support having three wheels for attachment to virtually all hand-held trimmers, metal detectors and the like. The three-wheeled support being readily retractable to a folded position for transportation and storage and extendible to a deployed or working position. The support having a pair of clamping plates flanking the trimmer's shaft, a rear leg, two lateral side legs, a slider actuator mounted to the rear leg for longitudinal sliding movement during transition between the folded and deployed positions of the support and an articulating linkage joining the actuator to the clamping plates.

6 Claims, 9 Drawing Sheets

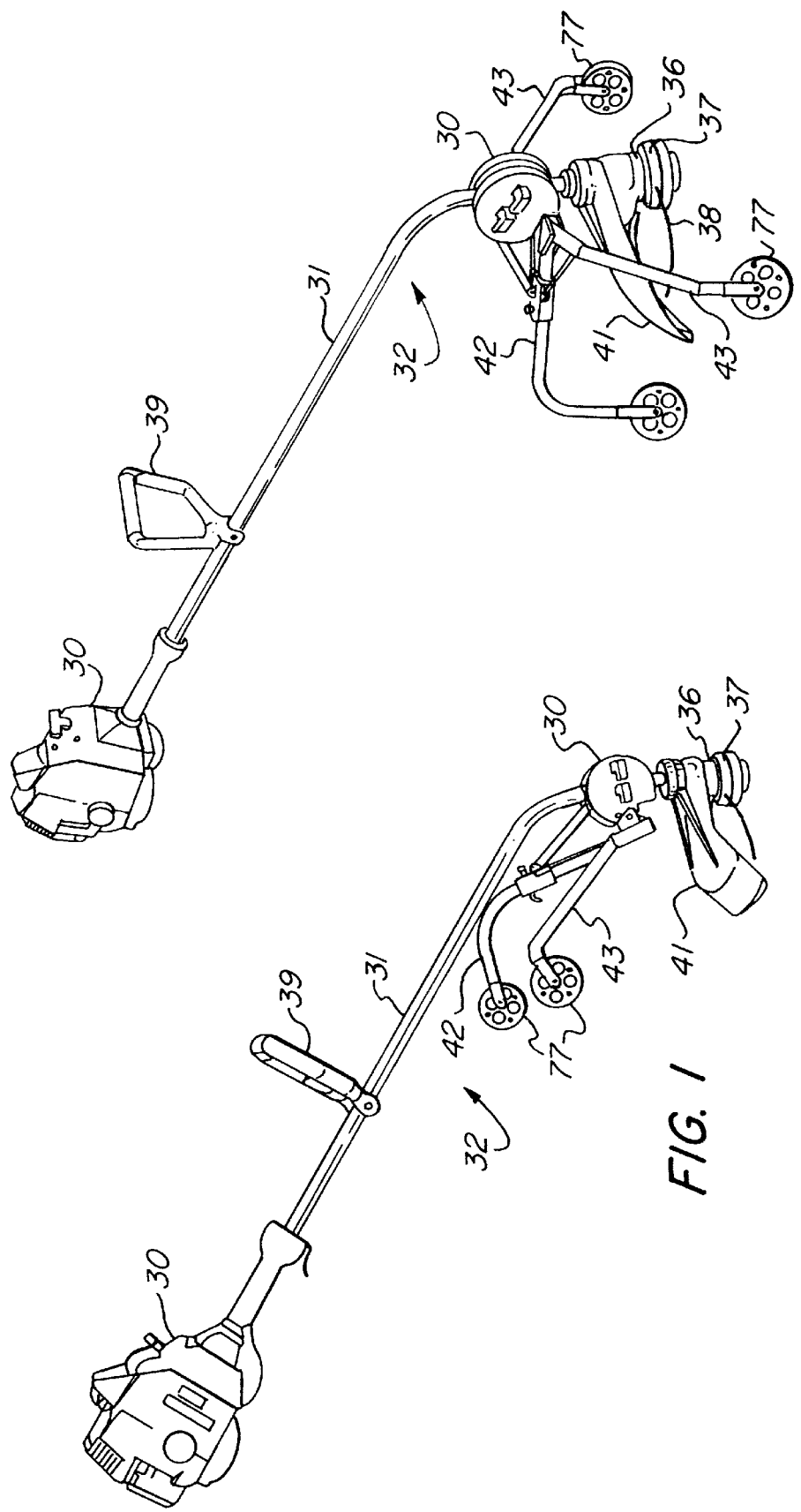

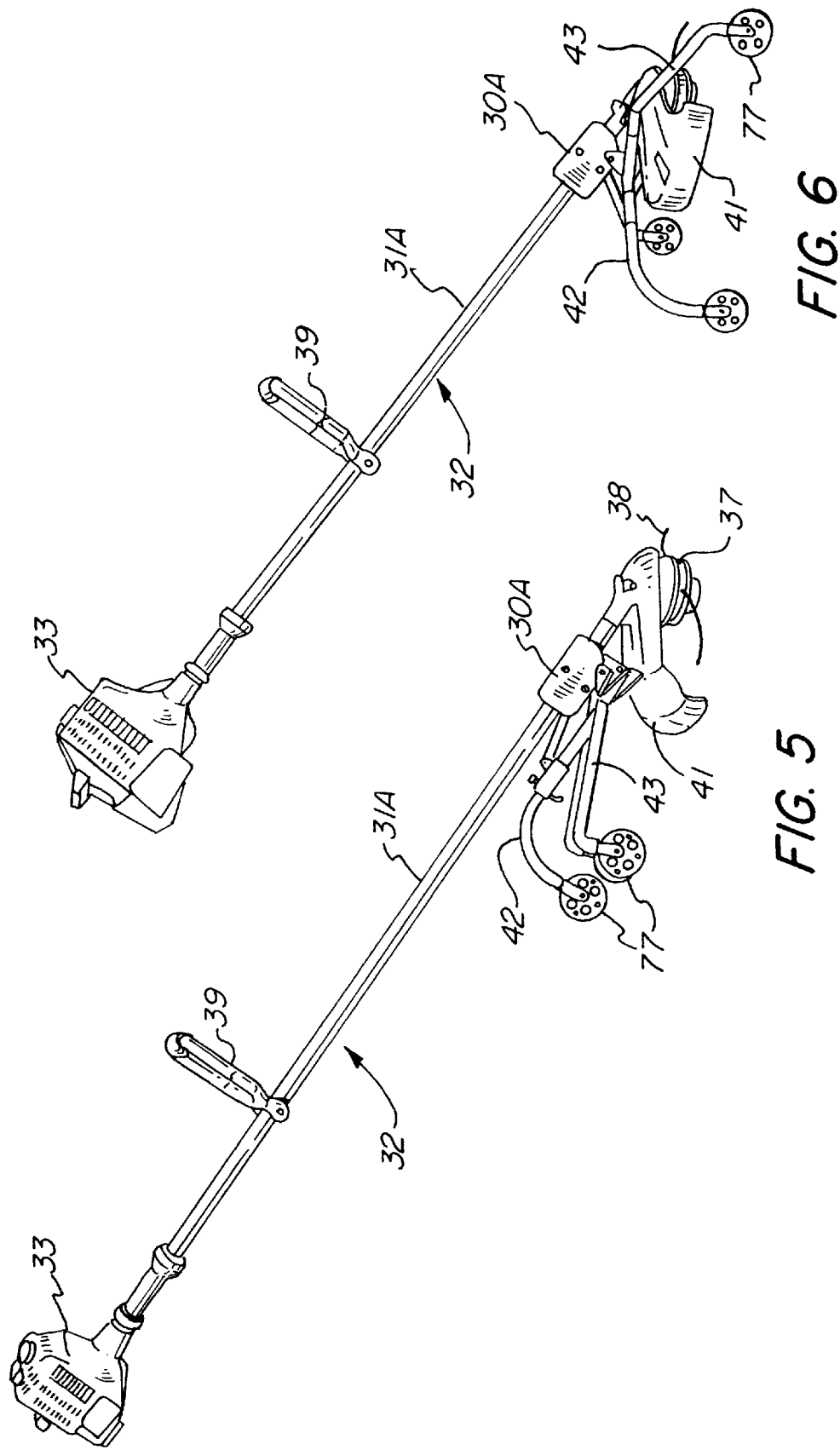

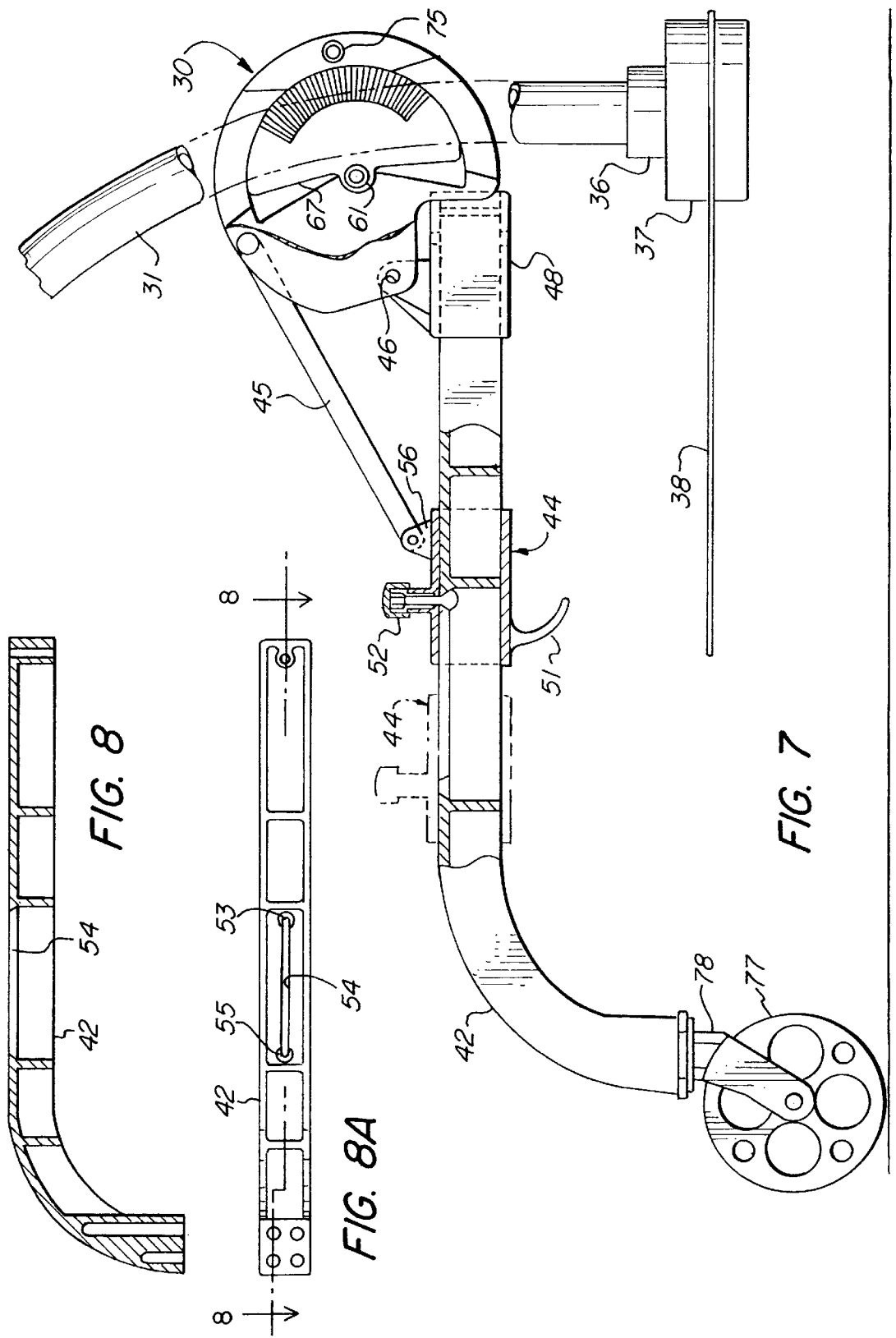

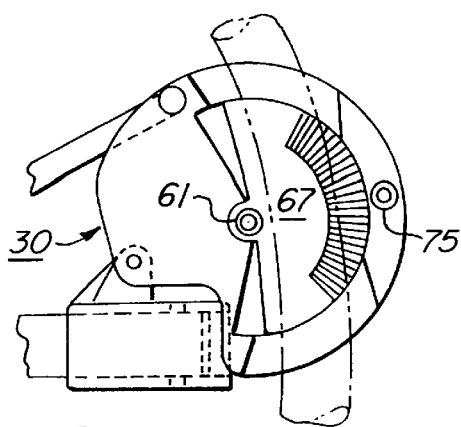
FIG. 13
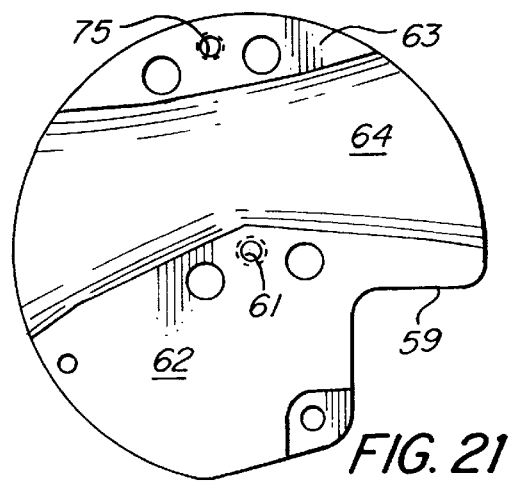
FIG. 21
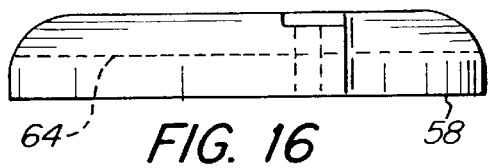
FIG. 16
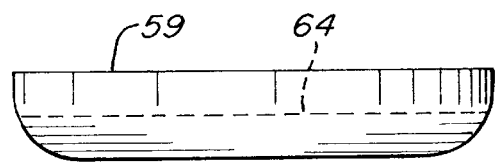
FIG. 22
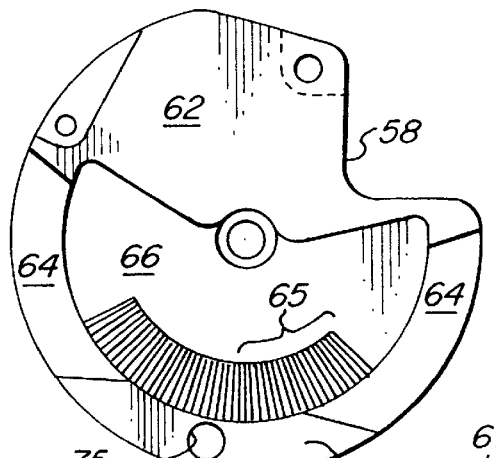
FIG. 14
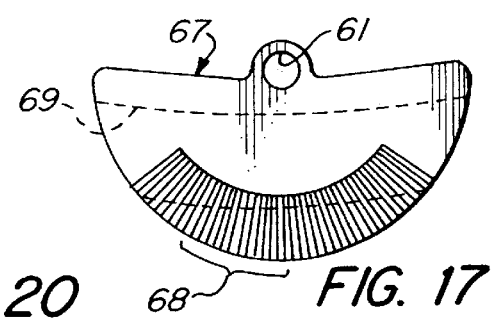
FIG. 20
FIG. 17
FIG. 18
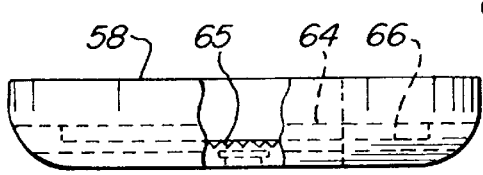
FIG. 15
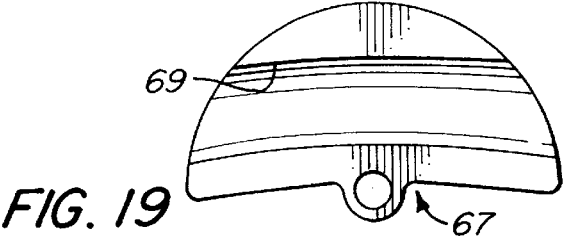
FIG. 19

QUICK MOUNT LEVELING, ADJUSTABLE AND RETRACTABLE ROLLER STABILIZER FOR STRING TRIMMERS

CROSS-REFERENCE TO RELATED APPLICATION

This application claims priority benefit under 35 U.S.C. 119(e) of provisional U.S. patent application Ser. No. 60/060,988, filed Oct. 3, 1997.

FIELD OF THE INVENTION

The present invention relates generally to power tool accessories and particularly to rolling support of hand held lawn equipment.

BACKGROUND OF THE INVENTION

U.S. Pat. No. 4,688,376 issued to Donald E. Wolfe, Sr. on Aug. 25, 1987 discloses an adjustable carriage for electric string trimmers which converts a string trimmer into a mower for small lawns. In order to free the trimmer from the carriage, the operator must physically detach the mechanism from the trimmer. A trimmer independent of any support mechanisms produces an uneven cut, while physically straining the operator. It is a highly valuable and efficient objective to develop a mechanism which could transform a hand held trimmer into a mower and convert it back into the independent trimmer without removing the conversion mechanism, thus improving the quality of the trimmer's operation, its safety, efficiency and functionality, and adapting it for trimming slanted banks smoothly and uniformly.

A number of U.S. patents have suggested the installation of wheels on string trimmers. See for example: U.S. Pat. Nos. 5,450,715; 5,222,750; 5,092,112; 4,879,869; 4,442,659; and 4,704,849.

These are all heavy, clumsy, awkward devices, lacking convenient adaptability between a wheels-deployed "mower" condition and the wheels-retracted "trimmer" condition.

SUMMARY OF THE INVENTION

No existing combination of string trimmer and wheel support is believed to provide the advantages of the present invention, achieving the objects thereof.

The trimmer stabilizer, which I call the Level Head or Quick Mount Roller, easily attaches to virtually all gasoline and electric lawn and garden string trimmers, metal detectors and similar devices, allowing greater functionality of the trimmer. The Roller carriage is lightweight and may be used while permanently attached to the trimmer since the Roller may occupy either one of two fixed positions, a deployed position or a retracted position.

Principal objects of the invention are that in its deployed position, the Roller should stabilize the trimmer, improve the uniform cut of the trimmer's string, increase the safety of the trimmer by reducing the physical strain upon the operator, allow the operator to have greater control of the trimmer as well as increase the trimmer's functionality by converting it into a mower which may be used to cut small lawns and banks evenly. Furthermore, in the Roller's deployed position, the operator may vary the angle with which the trimmer cuts vegetation, as in trimming grass at the edge of a flower bed.

Another object of this invention is that while in its retracted state, the Roller retracts upwards close to the trimmer's shaft and away from the trimmer's string, allowing the trimmer to function as if the Roller was never attached to it. Moreover, the invention is extremely lightweight, and minimally alters the balance of the trimmer and the strain upon the operator while the invention is in its retracted state.

Still other objects are to provide the Roller carriage as described which is easily manufactured, easily assembled, compatible with virtually all trimmers (curved or straight shaft), readily operated, and is durable and attractive in appearance.

BRIEF DESCRIPTION OF THE DRAWINGS

For a fuller understanding of the nature and objects of the invention, reference should be made to the following detailed description taken in connection with the accompanying drawings, in which the present invention is diagrammatically described.

FIG. 1 is a perspective diagrammatic side elevation view of a curved shaft string trimmer having one embodiment of the present invention mounted just above the trimmer string head at the lower end of the trimmer shaft, shown in its wheels retracted condition.

FIG. 2 is a similar perspective side elevation view of the same device, showing it in its wheels-deployed conditions.

FIGS. 5 and 6 are perspective side elevation views of another embodiment, mounted on a straight-shaft trimmer, in its respective wheels-retracted and wheels-deployed conditions.

FIG. 7 is a fragmentary diagrammatic side elevation view, partially in section, showing the retraction-deployment mechanism cooperating with the rear leg of the device of FIGS. 1 and 2.

FIG. 8 is a reduced size cross-sectional side elevation view of the rear leg shown in FIG. 7, taken along the plane 8—8 shown in FIG. 8A.

FIG. 8A is a corresponding bottom plan view of the rear leg shown in section in FIG. 8.

FIG. 13 is a fragmentary cut-away side elevation assembly view of the leveling protractor housing, employed for adjusting the trimmer cutting plan to a horizontal level in the wheels-deployed condition of the device.

FIGS. 14–22 are various views of the cooperating parts of the leveling protractor mechanism; FIGS. 14, 17, 19 and 21 are side elevation views, FIGS. 15, 16, 18, and 22 are end elevation views, and FIG. 20 is a cross-sectional end elevation view.

FIG. 24 is an exploded perspective view; FIG. 25 is a cross-sectional top plan view of the unclamped assembly; and FIG. 26 is a corresponding cross-sectional view of the clamped assembly.

BEST MODE FOR CARRYING OUT THE INVENTION

Figure 4:
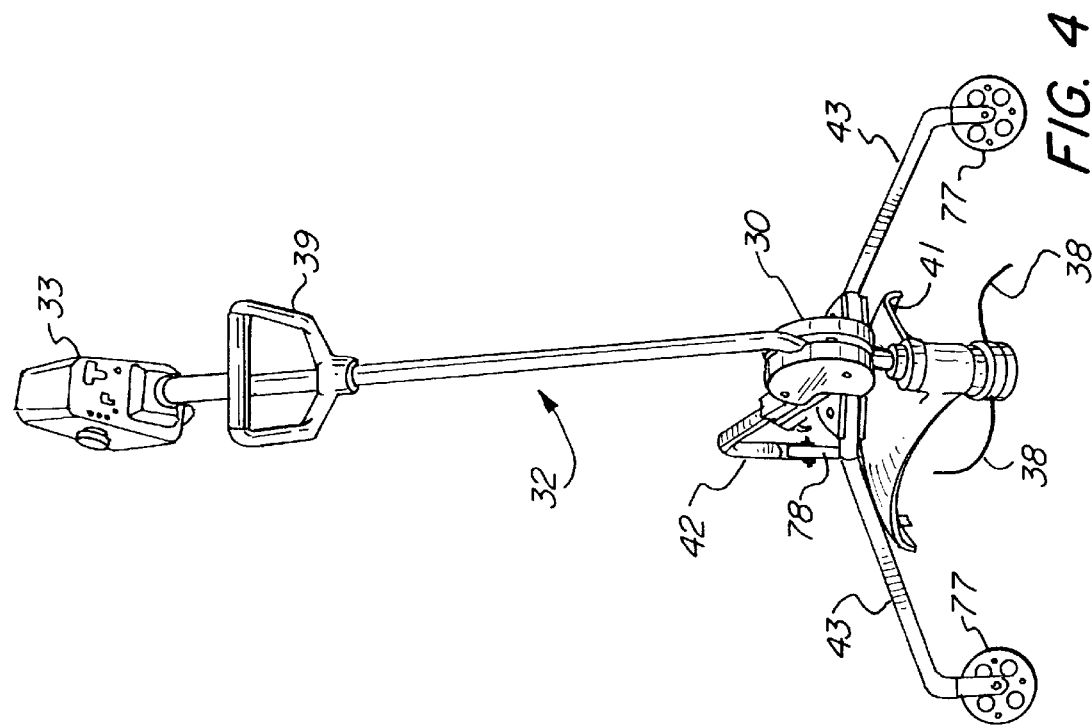
FIGS. 3 and 4 are front perspective views of the same Level Head attachment mounted on the curved shaft trimmer in its respective wheels-retracted and wheels-deployed conditions.

The Level Head Quick Mount attachments of this invention incorporate a quick-release level adjustment housing 30 embracing and clamped to the hollow shaft 31 of a string trimmer, metal detector or similar portable device. Trimmer 32 has a power housing enclosing a power unit, such as a lightweight gasoline or electric motor 33, mounted at the upper end of its elongated hollow shaft. Motor 33 drives a flexible drive cable 34 inside shaft 31, which extends out the lower end of shaft 31 and is connected to rotate a spool hub 36 carrying a trimmer strand delivery spool 37 from which two trimmer strands 38 protrude radially for trimming grass, weeds and similar vegetation.

A central handle 39 and a footguard 41 are provided for the convenience and protection of the user.

Level adjustment housing 30 embraces and clamps on the shaft 31 just above the spool hub 36 at the shaft's lower end, and supports three pivoted legs, a rear leg 42 and right and left side legs 43.

Figure 3:
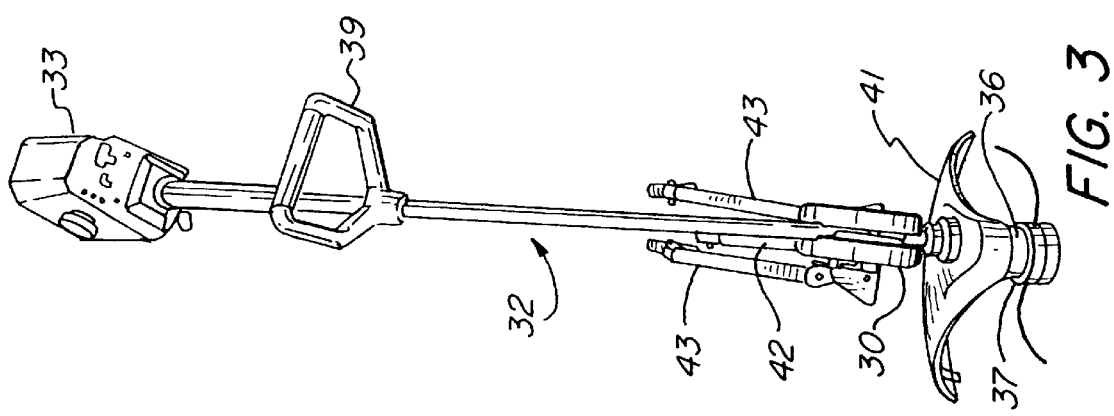

A slider actuator 44 is mounted on rear leg 42 and is movable from a forward, deployed position shown in FIGS. 2, 4, 6, 7 and 9, to a rearward, retracted position shown in FIGS. 1, 3 and 5, and in dashed lines in FIG. 7.

Figure 9:
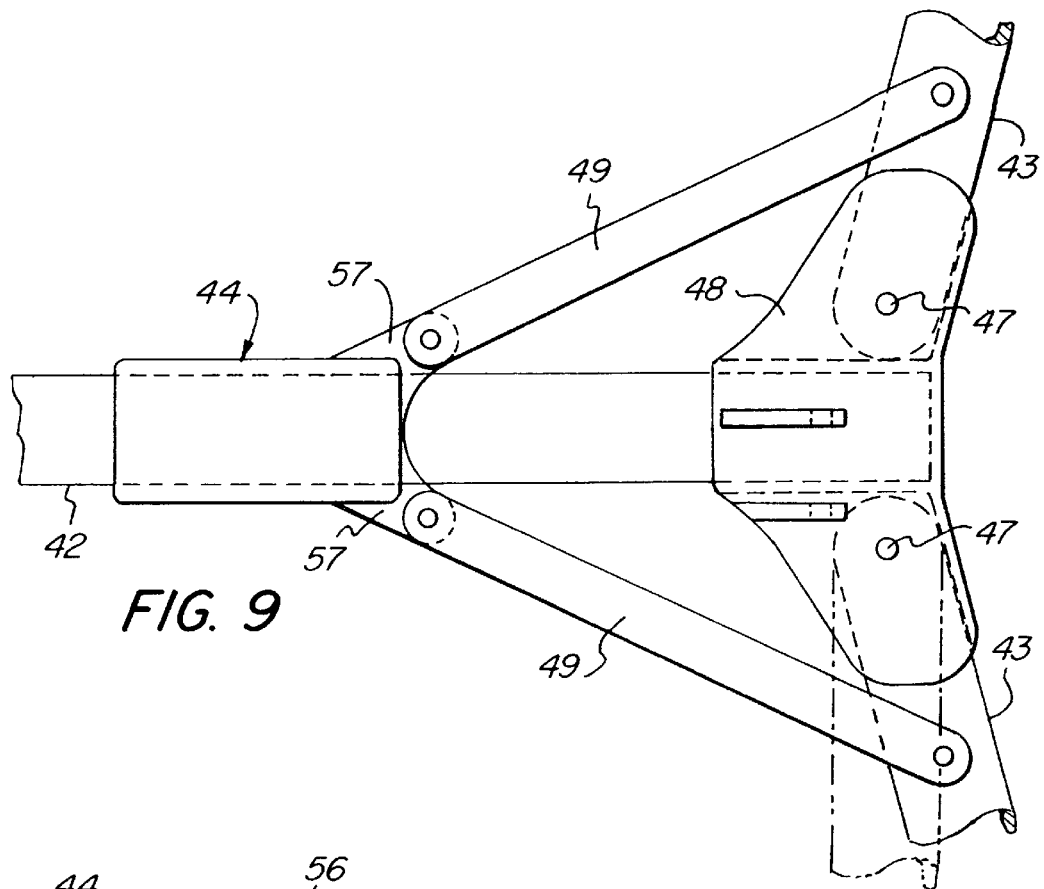
FIG. 9 is a fragmentary diagrammatic top plan view of a portion of the mechanism shown in FIG. 7.
Figure 10:
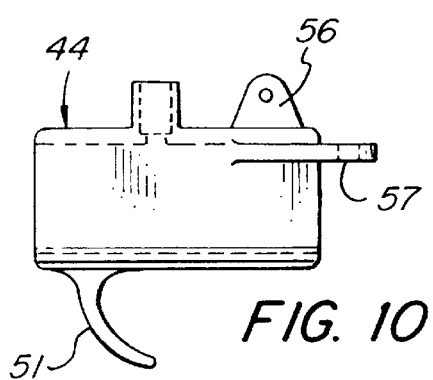
FIGS. 10, 11 and 12 are respective side, top and front end views of the slider actuator controlling the deployment and retraction of the wheels shown in FIGS. 1, 2 and 7.
Figure 11:
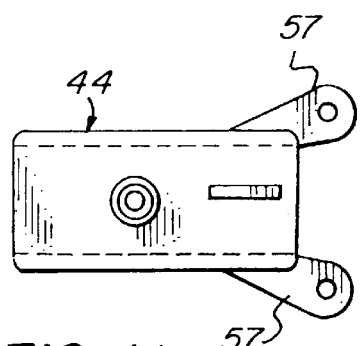
Figure 12:
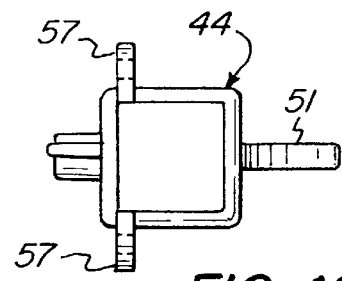
Figure 23:
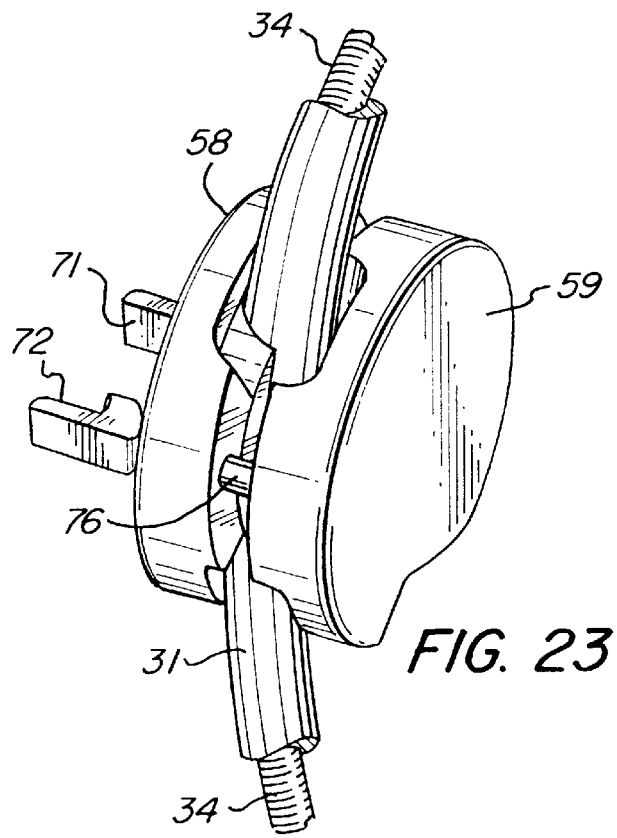
FIG. 23 is a perspective front end elevation view of the leveling protractor assembly in its unclamped condition.
Figure 24:
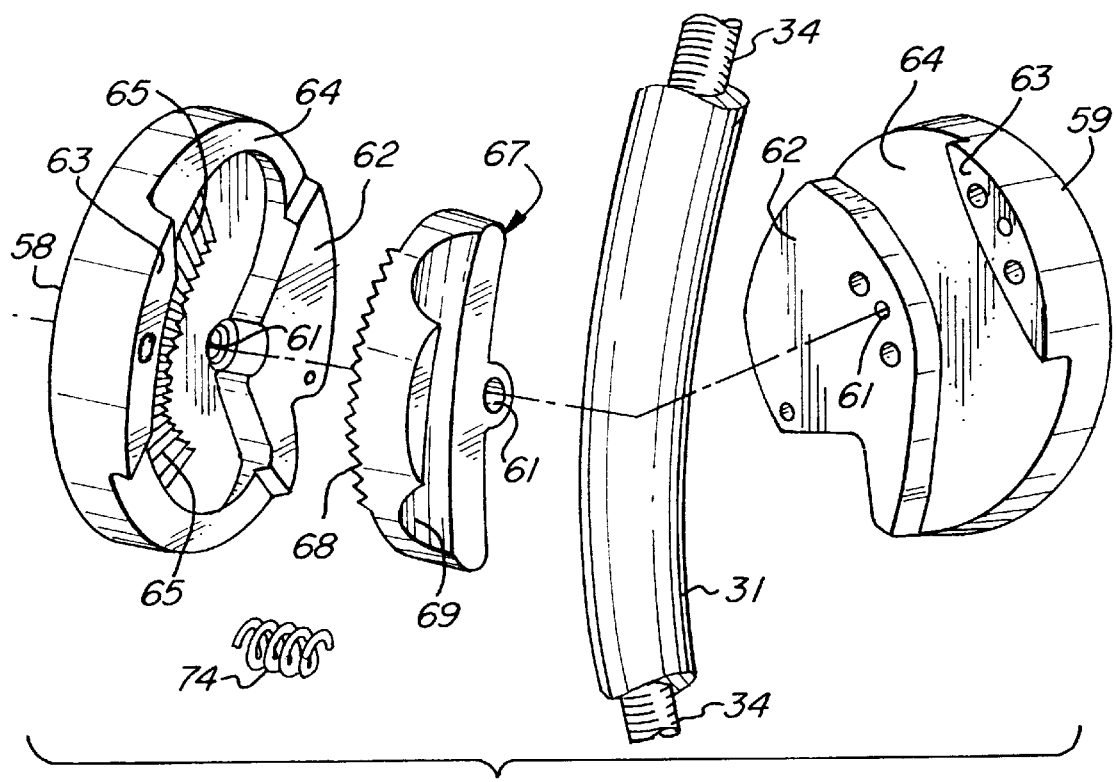
FIGS. 24, 25, and 26 are assembly views of the leveling protractor components of FIGS. 14–23.

The slider actuator is joined by a pivoted top link 45 to the adjustment housing 30, and its rearward retraction draws the rear leg 42 up close to the shaft 31, pivoting about pivot 46 on the housing 30. Rearward retraction of slider actuator 44 simultaneously draws both side legs 43 rearward toward rear leg 42, acting through side links 49, and pivoting the side legs about pivots 47 on a wing-flange support 48 mounted at the forward end of rear leg 42, (FIG. 9).

The slider actuator 44 is slidably movable along rear leg 42 between its two limit positions by the user's forward and rearward movement of its depending finger trigger 51. A thumb-depressible spring detent 52 atop actuator 44 (FIG. 7) seats in front and rear terminal bores 53 and 55 forming the ends of a narrow guide slot 54 extending between bores 53 and 55 along the top of rear leg 42 (FIGS. 8 and 8A). Detent 52 is shown spring biased into engagement with the forward bore 53 in FIGS. 2, 4, 6 and 7, and it is shown engaged in rear bore 55 in FIGS. 1, 3 and 5.

Actuator 44 is provided with a top pivot flange 56 for pivoted connection to top link 45, and two lateral side pivot flanges 57 for pivoted connection with side links 49, as shown in FIGS. 9–12.

The mechanism in the level adjustment housing permits easy attachment of the assembly 29 to all standard string trimmers. It also provides accurate leveling of the trimmer strands' cutting plane by quick and convenient adjustment, and by readjusting to a forwardly tilted plane position, the device is quickly adapted for edging flower beds, mulched tree beds, shrubbery, walkways and curbs.

The component parts of the leveling mechanism in housing 30 are shown in FIGS. 13 to 22, and the assembled mechanism is shown in FIGS. 23 to 26. Shaft 31 of the string trimmer is clamped between two clamping plates or "collars", a sector rack clamping plate 58 and a grooved clamping plate 59.

Figure 25:
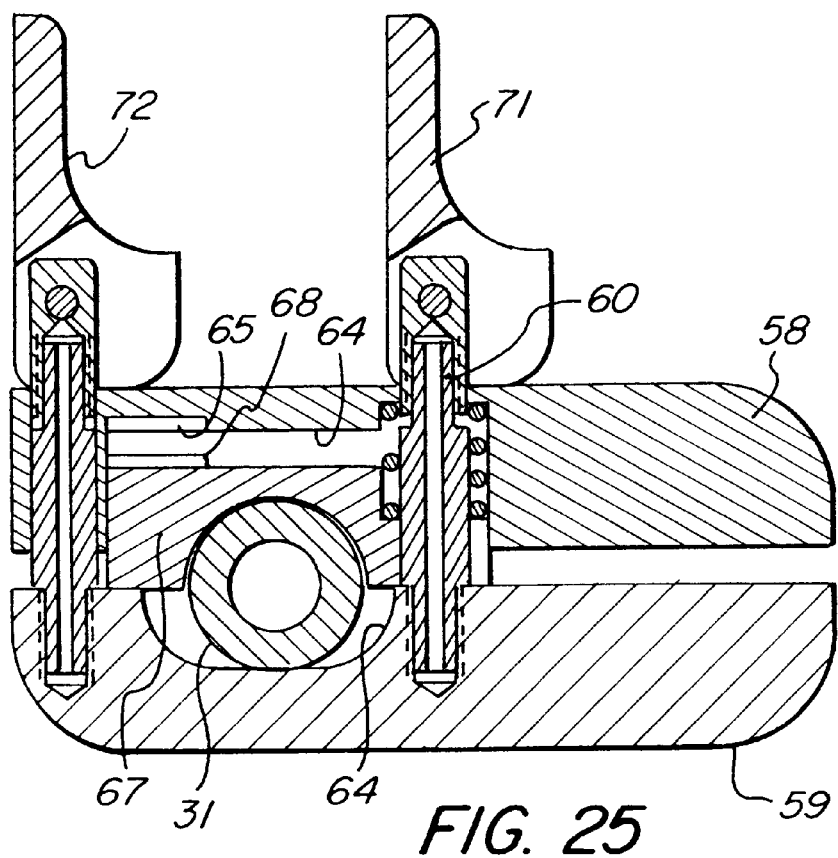
Figure 26:
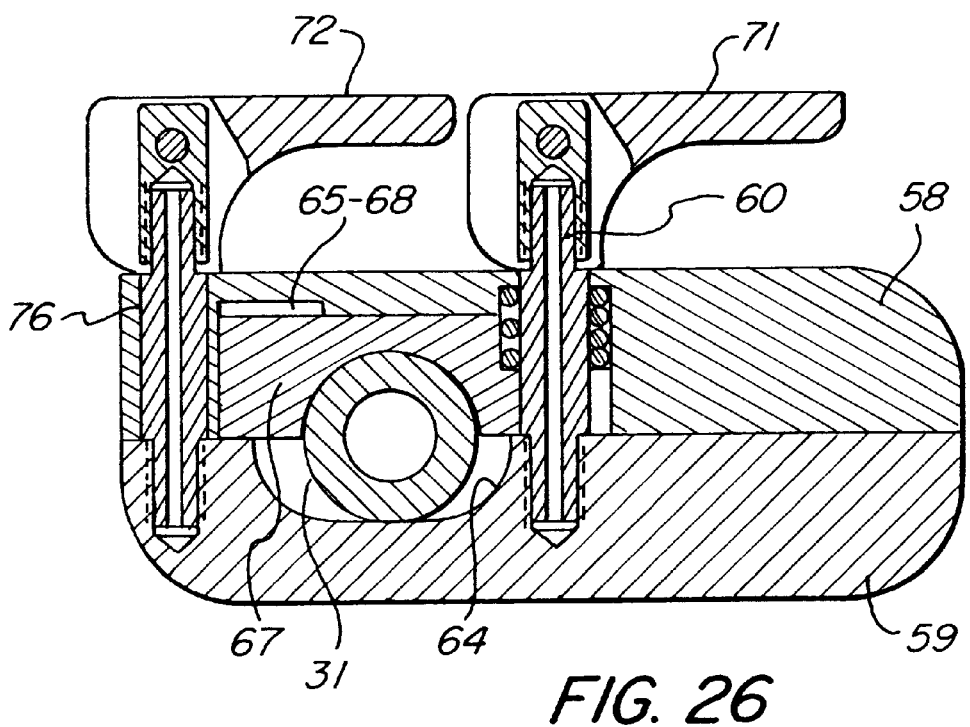

Both plates 58 and 59 are substantially circular thick disks each provided with a central bore 61 accommodating a pivot pin 60, a raised major land 62 on their facing surfaces bore 61, a small raised rim land 63 opposite land 62, and a transverse channel 64 spanning each plate between its major land 62 and its small rim land 63, extending axially for about 50% of the plate's thickness toward the facing plate. A first toggle latch 71 is pivoted on the exposed end of pivot pin 60, abutting plate 58 (FIGS. 25, 26). Rim lands 63 are provided with aligned bores 75 (FIGS. 14, 21, 24) accommodating a latch pin 76 (FIGS. 25, 26), and the second toggle latch 72 is pivoted on the exposed end of pin 76, abutting plate 58.

Recessed in the floor of channel 64 of the sector rack clamping plate 58 is an angular sector shaped recess 66 subtending an arc of about 225° arrayed around the rim of this recess in the central floor portion of this 225° arc is an arcuate rack of cutaway radially extending gear teeth 65 subtending an arc of about 1100, facing the transverse channel 64 of the facing clamping plate 59.

Shown in FIGS. 17, 18, 19 and 20 is a substantially semicircular protractor rack 67, dimensioned to fit in sector shaped recess 66 in plate 68. Rack 67 subtends an angular arc of about 193° and has a radius slightly smaller than that of sector shaped recess 66. Rack 67 is provided with a bore 61 aligned with those of plates 58 and 59, and rack 67 is provided with a sector of radially-extending gear teeth 68 aligned to mesh with teeth 65 in recess 66. A pivot pin 60 extends through aligned bores 61, as shown in FIG. 25.

As shown in FIGS. 17, 19 and 20, a slightly curved semi-cylindrical groove 69 extends across the widest part of sector rack 67 on the face opposite plate 58 and engageable gear teeth 65–68. Groove 69 is dimensioned to accommodate freely all conventional diameters of standard curved shafts 31 of string trimmers, with enough clearance to accept all standard commercial trimmer shafts, even those having a slightly different radius of curvature than that of groove 69.

As shown in FIGS. 25 and 26, shaft 31 is clamped between groove 69 of rack 67 and plate 59 when first and second toggle latches 71 and 72 are latched, as in FIG. 26. When clamped, shaft 31 extends between channels 64 in plates 58 and 59. FIGS. 7 and 13 show trimmer shaft 31 centrally positioned in channels 64, with sector teeth 68 on rack 67 centrally engaged along gear teeth 65 in recess 66 of plate 58.

Clamping and unclamping of shaft 31 is achieved by the toggle latches 71 and 72, cooperating with a sturdy compression coil spring 74. Spring 74 encircles pivot pin 60 between protractor sector rack 67 and sector rack clamping plate 58, and is shown compressed in FIG. 26 with both toggle latches in their closed or clamping position, in which the engaged teeth 65 and 68 of the sector racks are clamped in their adjusted position.

By releasing toggle latches 71 and 72 (FIG. 25), protractor sector rack 67 is disengaged from plate 58 by spring 74 and the engaged teeth 65 and 68 are thus disengaged; this permits protractor sector rack 67 to pivot relative to plate 58 (and plate 59), around pin 60 in bore 61, and allows sensitive adjustment of the trimmer strands' cutting plane, for level or tilted orientation relative to the horizon.

Wheels 77, which may be perforated as shown in FIG. 7, are mounted in swiveling forks 78 depending from the outer ends of legs 42 and 43. When deployed, as in FIGS. 2, 4 and 6, the three-wheel support and freely swiveling wheels 77 are uniquely effective in adapting the conventional string trimmer to serve as a readily maneuverable lightweight lawn mower for slopes, banks, and small lawns. FIGS. 2 and 4 clearly show that the side wheels at the outer ends of side legs 43 are widely spread flanking the trimmer strand hub, exposing nearly the forward 180° of the trimmer strands orbit forward of these side wheels. This assures that the trimmer's effectiveness is not impeded by the deployed wheels of these roller stabilizers.

Strong and weatherproof aluminum alloys or sturdy molded polymers may be used in fabricating the larger components of these devices, while stainless steel provides wear-resistance for pivot pins, clamping pins, toggle latches and like components.

Figure 27:
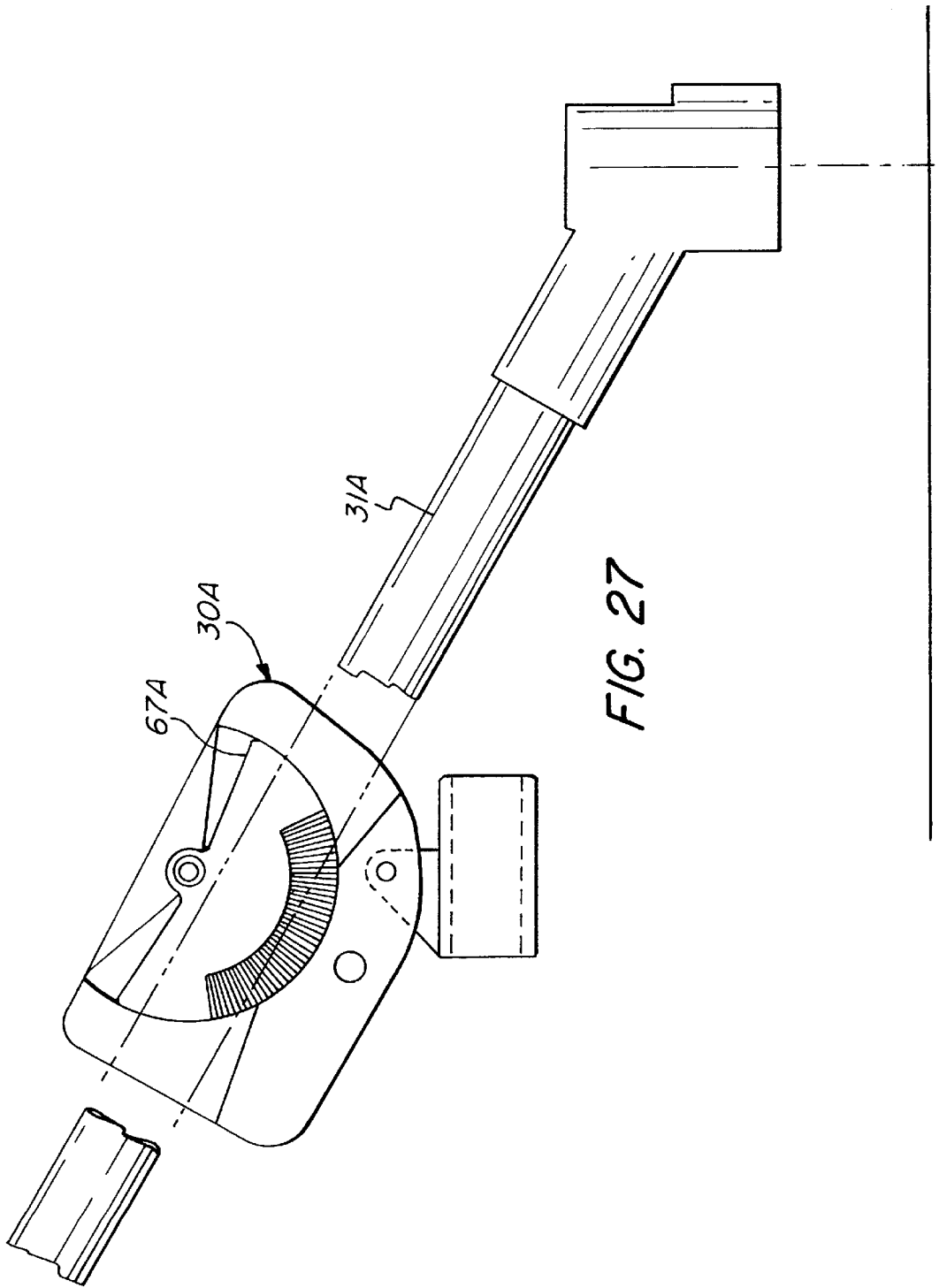
FIG. 27 is a fragmentary diagrammatic side elevation view of a leveling protractor assembly employed in a modified embodiment designed for installation on straight shaft trimmers as shown in FIGS. 5 and 6.

In straight shaft string trimmers, shown in FIGS. 5, 6 and 27, the straight shaft 31A is clamped in an adjustable clamping housing 30A incorporating components corresponding to those described, but as indicated in FIG. 27, the shaft-receiving groove in protractor rack 67A is straight, rather than slightly curved as shown in FIGS. 17 and 19.

It will thus been seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A three-wheel stabilizer mounted on a portable string trimmer having a lightweight power unit mounted at the upper end of a lightweight hollow shaft enclosing a drive cable transmitting torque to rotate a spool hub at the lower end of said hollow shaft from which two trimmer strands protrude radially defining a plane of strand rotation, said three-wheel stabilizer being readily retractable to a folded position near said hollow shaft and extendible to a deployed position, and comprising:
   a pair of clamping plates flanking the string trimmer shaft,
   latching means releasably securing the clamping plates in abutting engagement with the trimmer shaft and anchoring the shaft between themselves,
   a rear leg having an apertured forward end pivotally connected to the clamping plates for pivoting movement about a transverse pivot axis toward and away from the trimmer shaft, and a downturned rear end having a swiveling rolling wheel mounted thereon,
   two lateral side legs each having an apertured proximal end pivotally joined to the forward end of the rear leg for pivoting movement toward and away from said rear leg, and a downturned distal end having a swiveling rolling wheel mounted thereon,
   a slider actuator mounted on the rear leg for longitudinal sliding movement between two limit positions, a forwardly latched deployed position and a rearwardly latched retracted position,
   and an articulating linkage joining the actuator to the clamping plates and to intermediate pivot points on said side legs connected to draw the side legs toward the rear leg as the actuator approaches the retracted position and to extend the side legs laterally away from the rear leg while also pivoting the rear leg downward away from the pivot shaft as the actuator approaches the deployed position, whereby in the actuator's deployed position all three swiveling rolling wheels are separated to define a rolling plane beneath the string trimmer's plane of strand rotation.

2. The stabilizer defined in claim 1 wherein both clamping plates are provided with facing grooves in their facing surfaces wider than the maximum transverse dimension of the trimmer shaft anchored between them, whereby the trimmer's plane of strand rotation can be adjusted relative to said rolling plane defined by the stabilizer's deployed wheels.

3. The stabilizer defined in claim 2, wherein
   one of said clamping plates incorporates a first toothed curved sector rack centered about a central latch pin extending through both clamping plates, and facing an internal cavity defined by and enclosed between the clamping plates,
   and further including a protractor sector rack member embraced within said internal cavity and dimensioned for angular movement about an aperture formed therein aligned with said central latch pin, having a corresponding second toothed curved sector rack engageable with said first sector rack,
   said protractor member having a shaft engaging groove closely engageable with the trimmer shaft,
   whereby unlatching release of said clamping plates from their anchored clamping engagement with the trimmer shaft disengages the two toothed sector racks, and angular adjustment of the protractor member followed by latching clamping of the clamping plates re-engages the sector racks and adjusts and then fixes the rolling plane relative to the plane of the trimmer's plane of strand rotation.

4. The stabilizer defined in claim 1, wherein the articulating linkage includes:
   a top link having a rear end pivotally joined to said actuator and a forward end pivotally joined to said clamping plates at a pivot point spaced above the pivotal connection of said rear leg's forward end with said clamping plates,
   and two side links having apertured rear ends pivotally connected to the respective right and left sides of said actuator, and having apertured forward ends pivotally connected respectively to said intermediate pivot points on said lateral side legs,
   whereby retracting rearward movement of the slider actuator along the rear leg causes the top link to draw the rear leg up toward the trimmer shaft, while the side links simultaneously draw their forward pivot points rearward, causing both side legs to swing toward the rear leg and bringing all three legs into their retracted positions near the trimmer shaft.

5. The stabilizer defined in claim 1, wherein the slider actuator is provided with a depending finger trigger presented for convenient movement of the actuator by the user, sliding the actuator along the rear leg between its two limit positions.

6. The stabilizer defined in claim 1, wherein the slider actuator is provided with a thumb-depressible detent above the rear leg, releasably engageable with a limit socket at each limit position of the actuator, and automatically maintained engaged in a limit socket until the thumb-depressible detent is depressed by the user.

* * * * *

UNITED STATES PATENT AND TRADEMARK OFFICE
CERTIFICATE OF CORRECTION

PATENT NO. : 5,970,694
DATED : Oct. 26, 1999
INVENTOR(S) : Robert J. Knox

It is certified that error appears in the above-indentified patent and that said Letters Patent is hereby corrected as shown below:

In column 4, line 16 "1100" should be —110°—

Signed and Sealed this

Seventeenth Day of April, 2001

*Attest:*

NICHOLAS P. GODICI

*Attesting Officer*   Acting Director of the United States Patent and Trademark Office